Patented May 1, 1928.

1,668,503

UNITED STATES PATENT OFFICE.

MARY E. HALL, OF CHICAGO, ILLINOIS.

MASSAGE AND CLEANSING CREAM AND METHOD OF PREPARING THE SAME.

No Drawing.   Application filed September 20, 1926.   Serial No. 136,739.

This invention relates to a facial massage and cleansing cream.

An object of this invention is to provide such a cream having as one of its principal ingredients sweet whole milk and at the same time to provide a means for preventing said sweet milk from settling out or from spoiling.

These and other objects, as will hereinafter appear are accomplished by my invention, the preferred embodiment of which contains the following ingredients:

3 lbs. bleached white bees wax.
18 oz. spermaceti.
84 oz. distilled water.
3 lbs. sweet whole milk.
12 lbs. sweet almond oil.
12 teaspoonsful borax.
2 oz. four-flower perfume blend (essential oils).

The water is heated to 70° F. and the borax dissolved in it. The two waxes and the almond oil are then heated to a temperature of 70° and mixed together after which they are mixed with the water and borax, the whole being constantly stirred with a paddle. The milk is then heated to substantially the same temperature and added. The perfume is heated and thoroughly mixed in after the whole has somewhat cooled. At no time should the mixture be heated much above 70° as the borax will then cause the whole to foam rapidly and if care is not taken will cause it to boil over. On the other hand unless it is heated to substantially 70°, the waxes will not melt.

A cleansing cream made according to the above formula contains no element which is in anyway injurious to the skin or has any tendency whatever to grow hair thereon, and the sweet milk although forming a relatively large percent of the whole, does not separate out nor does it sour and become rancid.

I believe that this preservative action is due in a large measure to the presence of the borax, and to some degree to the essential oils.

While I have shown and described but a single embodiment of this invention, it is to be understood that it is capable of many modifications. Changes therefore in the constituents may be made which do not depart from the spirit and scope of the invention as disclosed in the appended claims.

I claim:

1. A massage cream which comprises a mixture of a solution of borax, wax, oil and milk blended in proportions to produce a homogeneous cream of the class described.

2. A massage cream which comprises a mixture of an aqueous solution of borax, wax including spermaceti, whole milk, and oil thoroughly blended together in proportions to produce a homogeneous cream.

3. The process of producing a massage cream which comprises adding a solution of borax to melted wax and oil, adding milk thereto, the temperature of the solution of the borax, melted wax and milk being maintained at substantially the melting point of the wax until the combination is completed, and agitating the mixture to produce a homogeneous cream.

4. The process of producing a massage cream which comprises melting a mixture of waxes including spermaceti with an oil, mixing therewith a saturated solution of borax, at the temperature of the waxes, adding whole milk at the temperature of the mixture and blending the constituents together by agitation to produce a homogeneous cream.

5. The process of producing a massage cream which comprises melting white beeswax and spermaceti wax combined with sweet almond oil, adding a saturated solution of borax at a temperature of substantially 70° F. to the first named melted mixture with agitation, adding sweet whole milk at a temperature of substantially 70° F. to the mixture, and agitating the mixture to produce a homogeneous cream.

In testimony whereof I have hereunto set my hand this 3rd day of September, 1926.

MARY E. HALL.